United States Patent
Stone

(10) Patent No.: US 11,384,891 B1
(45) Date of Patent: Jul. 12, 2022

(54) HOSE PROTECTOR DEVICE

(71) Applicant: John Stone, Sealy, TX (US)

(72) Inventor: John Stone, Sealy, TX (US)

( * ) Notice: Subject to any disclaimer, the term of this patent is extended or adjusted under 35 U.S.C. 154(b) by 12 days.

(21) Appl. No.: 17/187,780

(22) Filed: Feb. 27, 2021

(51) Int. Cl.
*F16L 57/06* (2006.01)
*D04H 13/00* (2006.01)

(52) U.S. Cl.
CPC .............. *F16L 57/06* (2013.01); *D04H 13/00* (2013.01)

(58) Field of Classification Search
CPC ... F16L 57/06; F16L 57/00; F16L 7/00; F16L 11/10; F16L 55/1657; H01B 7/17; H01B 7/28; H01B 7/282; H02G 15/18; B65D 63/00; Y10T 428/1397; Y10T 428/139
USPC .................. 138/110, 103, 123–125; 428/34.1
See application file for complete search history.

(56) References Cited

U.S. PATENT DOCUMENTS

| | | | |
|---|---|---|---|
| 3,374,308 A * | 3/1968 | Haas | F16L 7/00 174/138 R |
| 4,930,543 A * | 6/1990 | Zuiches | F16L 57/00 285/47 |
| 5,535,787 A * | 7/1996 | Howell | H02G 3/0487 248/205.2 |
| 5,542,454 A * | 8/1996 | Carlson | E21B 17/1042 175/325.5 |
| 5,901,756 A * | 5/1999 | Goodrich | F16L 3/233 248/205.2 |
| 6,102,076 A * | 8/2000 | Romero, Jr | F01N 13/085 138/128 |
| 6,152,185 A | 11/2000 | Tucker | |
| 6,308,741 B1 * | 10/2001 | Payne | F16L 11/11 138/108 |
| 7,572,981 B2 * | 8/2009 | Koizumi | B64F 1/36 174/111 |
| 7,946,311 B2 * | 5/2011 | Koizumi | F16L 11/10 138/140 |
| 8,127,405 B2 * | 3/2012 | Barger | H02G 3/0481 24/306 |
| 8,205,314 B1 * | 6/2012 | Dermody, IV | B21D 49/00 382/163 |
| 8,502,069 B2 * | 8/2013 | Holland | H02G 3/0481 57/212 |
| 9,675,843 B2 * | 6/2017 | Petty | A63B 29/02 |
| 10,627,019 B1 | 4/2020 | Franklin | |
| 2002/0170727 A1 | 11/2002 | Holland et al. | |

* cited by examiner

*Primary Examiner* — Patrick F Brinson
(74) *Attorney, Agent, or Firm* — Bay Area IP Group, LLC; Ariel S. Bentolila

(57) ABSTRACT

A device including a textile protective component, wherein said textile protective component is configured to encapsulate and protect at least one of a hose, cable, and pipe from abrasion, rubbing, or scraping; a loop area, wherein the loop area is configured to removably fasten the textile protective component to the at least one of a hose, cable, and pipe; a hook area, wherein the hook area is configured to engage the loop area in fastening the textile protective component to the at least one of a hose, cable, and pipe; a stud implement, wherein the stud implement is configured to be operable for preventing the textile protective component from contacting a floor, ground, or other surfaces and imparting unmitigated damage to the textile; and a hole portion, wherein the hole portion is configured to engage the stud implement.

20 Claims, 2 Drawing Sheets

HOSE PROTECTOR DEVICE

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to a hose protector wrap. More particularly, certain embodiments of the invention relate to non-sparking hose or cable protector wraps.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Many conventional industrial and non-industrial settings require the use of hoses or cables that may be attached to various machines or tools. Especially in industrial settings, the hoses or cables may need to be protected from severe abrasion and/or wear from, for example, without limitation, constant movement when used with machines, dragging the hoses or cables across the floor, etc. Additionally, while the hoses or cables must also maintain an adequate degree of flexibility and ease of movement to allow the hoses or cables to function properly. Further, such hoses and cables may often be used alongside industrial applications and may be exposed to environments with flammable materials or explosive vapors. Therefore, protection for the hoses and cables may not utilize materials that may cause sparking to occur, such as, for example, iron and steel.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that conventional removable textile wraps may be used to protect hoses or cables from damage. Removable textile wraps may be used to protect hoses or cables from damage and still allow regular access to the hoses or cables when servicing may be required. Additionally, conventional removable textile wraps may also offer adequate flexibility and ease of movement so that the hoses or cables may have a degree of protection without a loss in functionality. While they do offer a degree of protection, such conventional textile wraps may wear out fairly quickly over time, especially when, for example, without limitation, dragged along abrasive surfaces such as concrete or metal grating, when used with automated machinery with repetitive movements, etc.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A-1B illustrate an exemplary hose protector wrap device, wherein FIG. 1A shows a top view of a hose protector wrap device and FIG. 1B shows a side view of a hose protector wrap device, in accordance with an embodiment of the present invention.

Figure 1A:
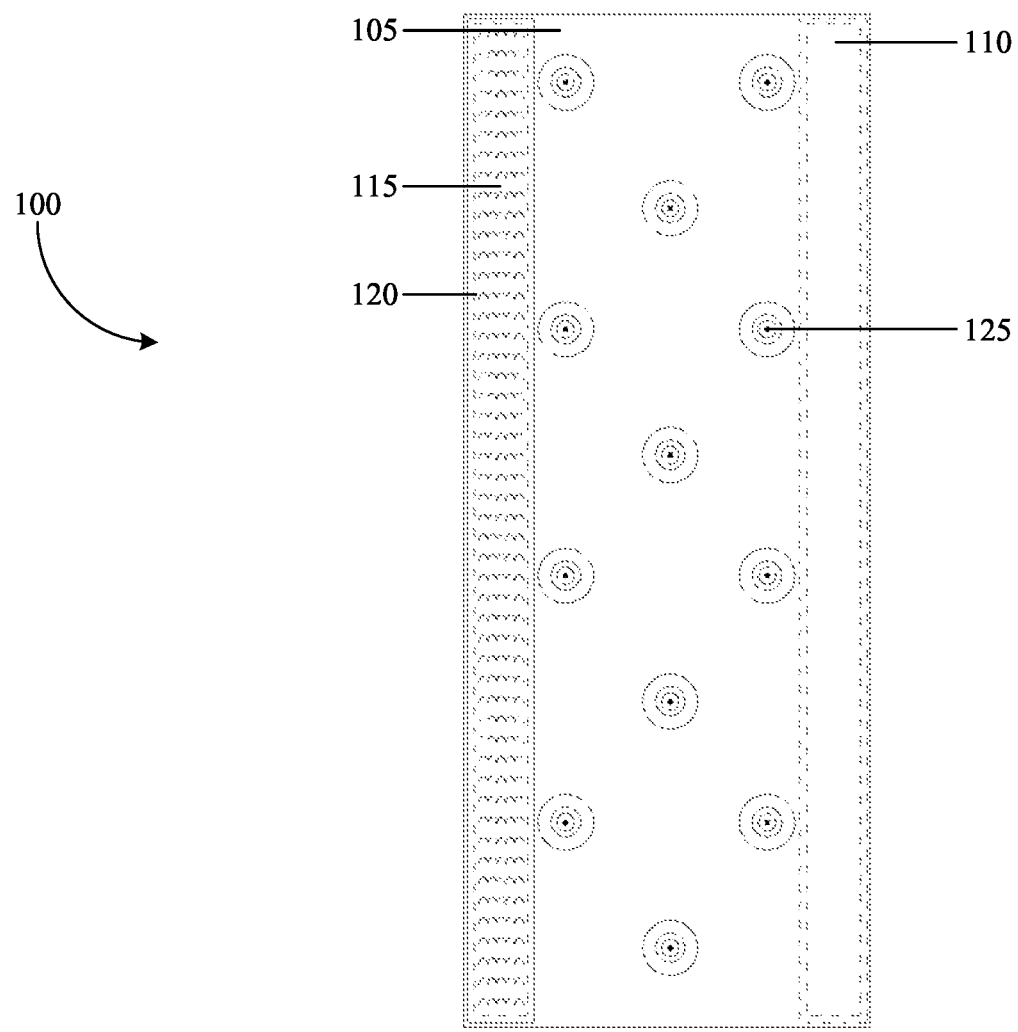

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir.

2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/ components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them—Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of," where one of these three terms is used herein, the disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of" or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

Figure 1B:
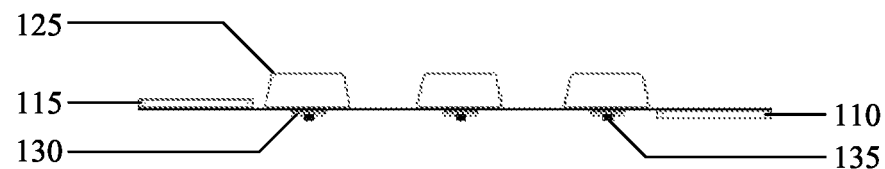

FIGS. 1A-1B illustrate an exemplary hose protector wrap device, wherein FIG. 1A shows a top and inner surface view of a hose protector wrap device and FIG. 1B shows a side view of a hose protector wrap device, in accordance with an embodiment of the present invention. Hose protector wrap device 100 may be used to encapsulate, enclose, and protect from abrasion, rubbing, or scraping, for example, without limitation, one or more hoses, one or more cables, one or more pipes, etc., especially in industrial environments wherein repetitive movement or dragging of the one or more hoses or one or more cables may cause eventual wear or damage over time. Hose protector wrap device 100 may comprise fabric or textile protective component 105, loop area 110, hook area 115, and stud implement 125. Textile protective component 105 may be flexible and/or removable and may be any type of textile or fabric known in the art, and may be composed of natural materials, such as, without limitation, wool, fibers, cotton, linen or blends thereof, cotton canvas or number duck, etc. or synthetic materials such as, without limitation, polyester, nylon, vinyl, engineered polymer fabric, woven and non-woven aramid fiber fabric, coated fiberglass fabric, rubberized fabric, synthetic rubber-like fabric, neoprene coated Kevlar or nylon fabric, Hypalon/csm, nbr nitrile material, etc. Alternatively, textile component 105 may be any other flexible, protective material known in the art, such as, without limitation, plastic, carbon fiber, mesh material, Lycra® and Lycra® blend stretch fabrics, stretchable rubber fabrics, including internal layers of thermal insulating and/or impact minimizing and impact absorbing materials consisting of Nomex® felt, polyester felt, or natural wool felt, or any other non-woven felt-like material, non-woven filter materials and materials designed to absorb liquids, chemicals or oil based substances, etc. Hose protector wrap device 100 may be removably secured around a hose, pipe, cable, etc. using hook area 115 and loop area 110. Hook area 115 may be sewn onto textile protective component 105, and may comprise multiple small hooks 120 for attaching to a corresponding multiple loops of loop area 110. In the present embodiment, hook area 115 may be disposed at one end, onto an outer surface area of textile protective component 105 such that small hooks 120 of hook area 115 may be on the same side as stud implement 125, while the loops of loop area 110 may be disposed at the other end, on an inner surface area of textile component 105, on the side opposite to stud implement 125, as shown in FIG. 1B.

Textile component 105 may be fastened to enclose a hose, a cable, or a pipe using loop area 110 and hook area 115 with stud implement 125 facing opposite the hose, cable, or pipe. In some embodiment, the loop area 110 and/or hook area 115 may be incorporated or integrated directly into textile protective component 105. Alternatively, the loop area 110 and/or hook area 115 may be incorporated or integrated into fabric or textile strips and the fabric or textile strips of loop area 110 and/or hook area 115 may be sewn or glued into textile protective component 105. For instance, the fabric or textile backed hook and loop may be sewn to the textile and/or fabric protective component. Or, the fabric or textile backed hook and loop may be glued to the textile and/or fabric protective component substrate (surface) using pressure-sensitive or solvent activated backings. The fabric or textile backed hook and loop strips may be welded, RF-sealed, or applied using heat-activation.

In another embodiment, stud implement 125 may include a plurality of studs where each stud may be secured to textile protective component 105 using, for example, without limitation, injection molding or rivet device 130 and washer appliance 135. Stud implement 125 may comprise, but not a limitation, a metal, a plastic, a rubber, a wood, a stone, a polymer, an alloy, and composite material. Rivet device 130 may include for example, but not a limitation, tubular rivet, blind/pop rivet, solid/round head rivet, oscar rivet, drive rivet, flush rivet, friction-lock rivet, and/or split rivets. Rivet device 130 may have a dual piece construction namely, first, a rivet body, shell, or hat and second, a stem or mandrel. Washer appliance 135 may create a wider and larger hold diameter that may prevent a pull through by distributing the pull through force over the larger area than with the rivet device by itself.

As such, as the hose, pipe, cable, etc. is enclosed or encapsulated with hose protector wrap device 100, where hook area 115 may be securely coupled to loop area 110. While in some embodiment, hose protector wrap 100 may be secured in places via hook area 115 and loop area 110, other securing means may also be used and considered within the scope of the present invention, such as, without limitation, zippers, clasps, buttons, hook and eye fasteners, snap fasteners, Velcro® brand fasteners, grommets, nuts and bolts, magnetic buckles or magnets embedded into the body of the wrap or attached to it by any means, etc. Further, a combination of different securement means may be used for hose protector wrap device 100. The width of hose protector wrap device 100 may vary depending on the needs of the user. Hoses, pipes, cables, etc. with larger diameters may require hose protector wrap device 100 to have a larger width, while hoses pipes, cables, etc. with smaller diameters may require hose protector wrap device 100 to have a smaller width. Additionally, multiple hoses, pipes, cables, etc. may be enclosed within hose protector wrap device 100. In certain situations, multiple hose protector wraps 100 may be used to accommodate for larger diameters, or multiple hoses, pipes, cables, etc. As such, multiple hose protector wraps 100 may be used in combination by attaching hook area 115 of a first hose protector wrap to loop area 110 of a second hose protector wrap, and attaching hook area 115 of the second hose protector wrap to loop area 110 of the first hose protector wrap. The wrap may be constructed of stretchable rubber or rubber-like material, or a stretchable Lycra® blend that would allow the wrap to stretch to accommodate different sizes of hoses/cables or pipes or bundles thereof.

While textile component 105 may make up the body of hose protector wrap device 100, in many industrial environments a textile wrap alone may not offer sufficient protection for an enclosed hose, pipe, cable, etc. Over time, the textile wrap may wear down due to environmental factors, such as, without limitation, abrasion from dragging across course surfaces, use with industrial machinery, etc. Thus, hose protector wrap device 100 may also incorporate stud implement 125. Stud implement 125 may keep textile protective component 105 from making direct contact with a rough surface, and may minimize abrasion from dragging or repetitive movements. In an embodiment, stud implement 125 may be disposed on the top or outer surface area of textile protective component 105 where each row of studs are placed in diagonally staggered rows to allow for adequate protection, while maintaining flexibility of the hose, pipe, cable, etc., as shown in FIG. 1A. The distance between the studs relative to stud height may prevent the body of hose protector wrap device 100 from contacting the abrasive surface environment. The diagonally staggered row pattern minimizes the number of studs 125 required to achieve this isolation of the hose protector wrap body from a relatively flat abrasive surface. Other stud layout patterns and spacings may also be employed to increase the number of studs 125 in order to more widely help prevent the effects of abrasion, thus prolonging the useful life of the studs, and to provide redundancy in the event that one or more studs 125 is damaged or torn off. The stud layout and spacing configurations may also be manipulated to offer greater protection from narrow, sharp objects, corners or other more pointed obstacles that hose protector wrap device 100 may encounter, in addition to relatively flat obstacles. As will be appreciated by one skilled in the art, any other stud configurations may also be used, such as, but not limited to, straight rows, straight columns, etc. Stud 125 configuration may be strictly linear and/or involve alternating patterns of different sized or shaped studs, or studs of different materials encompassing different hardnesses or abrasion resistance qualities. Studs 125 may also be made from soft, materials such as cork, wood or compressed fibers, or felt to enable the stud to decompose or actively wear away to protect the surface they are being dragged against. Some number of studs 125 made from chalk, colored waxes or other marking materials or substances may also be used to indicate that a workspace area had been processed or serviced. For example: a pneumatic grease gun's hose could be fitted with one of these hose wraps featuring these colored marking studs, thereby marking the surrounding surfaces in the course of operation and accurately indicating that lubrication or maintenance had been performed at that site. A stud configuration could include several studs 125 made from high zinc content alloys could be used as sacrificial anodes in marine or salt water environments to prevent corrosion to tools and the cables or hoses that the wraps were attached to. Preferably, the distance between each of studs 125 should be no more than 3 times the diameter of the stud so that textile component 105 may be adequately protected. However, the distance between each of studs 125 may vary depending on the specific needs of the user. Studs 125 may be secured to textile protective component 105 using, for example, without limitation, injection molding or rivets 130 and washers 135.

In some embodiment, studs 125 may be composed of a hard or abrasion resistant non-sparking and non-ferrous material, such as, without limitation, hard plastic, rubber, wood, stone, polymer, alloy, or any other composite material that may be attached to textile protective component 105. High-density polyethylene (HDPE) is a hard-rigid type plastic that may be made into studs 125. A low-density grade (LDPE) is a tough and flexible plastic. Polypropylene is a tough plastic that has a slightly waxy feel and may be bent repeatedly without breaking. Additionally, sparking material may also be used in environments where no flammable or explosive hazards are present, such as, without limitation, iron, steel, copper, etc. While studs 125 may be tall enough to minimize contact between textile protective component 105 and a rough floor and/or ground surface, studs 125 may also have a low physical profile and be in rounded or streamlined shape to prevent studs 125 from catching or snagging against objects or obstacles while the hose, pipe, cable, etc. is moved or transported. Studs 125 may be of various different shapes or sizes depending on the specific needs of the user, such as, without limitation, spherical, ovular, pyramidal, puck-shaped, etc. Studs 125 may be between ½ inch and ⅝ inch in diameter and no taller than 5/16 inch. Maintaining the maximum size and ratio of diameter to height, minimizes the possibility of stud 125 being snagged and ripped off of the body of the wrap. Studs 125 may be puck shaped and tapered slightly so that the top is smaller in diameter than the bottom to provide an adequately flat and stable surface to secure to the wrap, while the taper prevents a perpendicular right angle that would increase tendency of snagging. Studs 125 may be hemispherical, wherein the spheroid section may be devoid of perpendicular flat surfaces making it even more snag resistant than a tapered puck shape. As will be appreciated by one skilled in the art, different styles of hardware may be used in combination with or instead of studs 125 to minimize contact between textile protective component 105 and a rough surface, such as, without limitation, grommets, snap fasteners, buttons, nuts, bolts, etc. Additionally, a variety of different styles, types, sizes, shapes, etc. of studs may be attached to hose protector wrap device 100, and hose protector wrap device 100 may not be limited to using only one type of stud. Rivets securing studs 125 to the wrap body may be removed by minor drilling with appropriately sized drill bit and a standard cordless drill allowing worn studs to be replaced with new studs and re-riveted into place. Optionally, non-sparking brass threaded fasteners (nuts and bolts) could be used to fasten replacement studs to the wrap body, allowing for easy replacement in the field with more simplistic and commonly available hand tools like screw drivers and wrenches.

Figure 2:
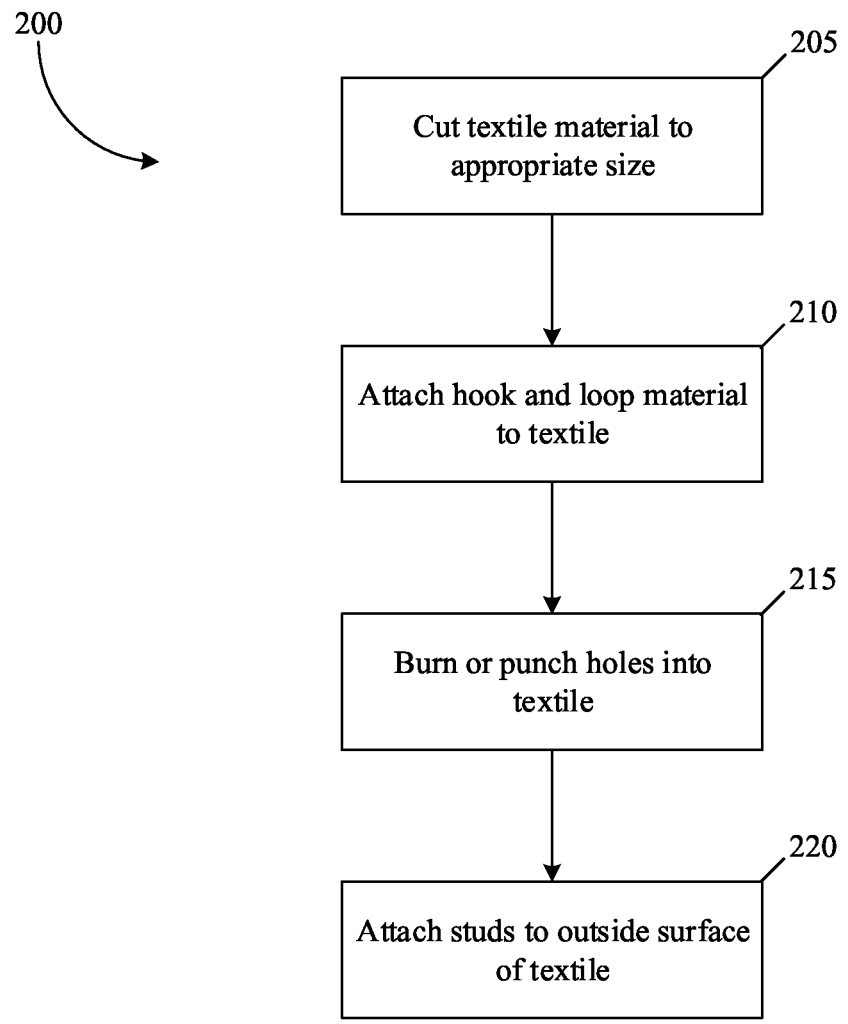
FIG. 2 illustrates a flow chart for an exemplary method for manufacturing a hose protector wrap device, in accordance with an embodiment of the present invention.

FIG. 2 illustrates a flow chart for an exemplary method for manufacturing a hose protector wrap, in accordance with an embodiment of the present invention. Method 200 may begin with a step 205 wherein textile material may be cut to an appropriate size. The specific size of the textile material may depend on the diameter of the hose, pipe, cable, etc. to be wrapped. In one embodiment, calculating textile width for a particulate hose/cable diameter may be as follows: taking the circumference of the hose or cable (or bundles thereof) and adding 4% nominally, for proper looseness of fit, then adding double the width of the fastener to be used. For example, a hose of two (2) inch diameter, multiply 2 by π (3.14)=6.28+4%=6.5312 (rounded to 6.5) Next: for a one (1) inch width hook & loop fastener (Velcro®) strips), add two (2) inches to the total: 6.5+2=8.5 inches. Accordingly, the total width of textile needed to create a wrap for the two (2) inch diameter hose, and using one (1) inch width hook & loop fastener is approximately 8.5 inches. Method 200 may then continue with a step 210, wherein hook and loop material may be attached to the textile. The hook and loop material may be attached using any means known in the art, such as, without limitation, sewing, gluing, ultrasonic welding, rf (radio frequency) welding, stapling, etc. Alternative securement means may be used instead of hook and loop material, such as, without limitation, zippers, clasps, buttons, hook and eye fasteners, snap fasteners, Velcro® brand fasteners, grommets, nuts and bolts, etc. Holes may then be burned or punched into the textile in a step 215 of method 200. The holes may be at various different distances from each other, depending on the desired final layout of the studs to be attached to the textile. After the holes are created, studs may be accommodated, attached and/or engaged to the outside surface of the textile in a step 220 of method 200. Various different means may be used to attach the studs to the textile. For example, without limitation, injection molding may be used to attach the studs. A specially designed injection mold may be used to secure the studs to the surface of the textile, wherein the mold may accommodate for the textile material during the molding process. The textile material may be inserted into the mold, and the stud may be molded such that the textile may be enclosed by the stud and the stud is securely in place. Alternatively, the studs 125 may be riveted to the textile protective component 105 using, for example, without limitation, aluminum rivets 130 and aluminum washers 135. In another embodiment, when using rivets, blind rivets or pop rivets may be used to secure the studs. As will be appreciated by one skilled in the art, injection molding and rivets may not be the only means of attaching the studs to the textile. Any similar method may be used, and processes may vary depending on the type of stud to be attached.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112(6) (post AIA 112(f)) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a hose protector wrap according to the present invention will be apparent to those skilled in the art. Various aspects of the invention have been described above by way of illustration, and the specific embodiments disclosed are not intended to limit the invention to the particular forms disclosed. The particular implementation of the hose protector wrap may vary depending upon the particular context or application. By way of example, and not limitation, the hose protector wrap described in the foregoing were principally directed to hose protection implementations; however, similar techniques may instead be applied to machinery protection means, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A device comprising:
   a textile protective component, wherein said textile protective component is configured to encapsulate and protect at least one of a hose, cable, and pipe from abrasion, rubbing, or scraping;
   a loop area, wherein said loop area is configured to removably fasten said textile protective component to said at least one of a hose, cable, and pipe;
   a hook area, wherein said hook area is configured to engage said loop area in fastening said textile protective component to said at least one of a hose, cable, and pipe;
   a stud implement, wherein said stud implement is configured to be operable for preventing said textile protective component from contacting a floor, ground, or other surfaces; and
   a hole portion, wherein said hole portion is configured to accommodate and engage said stud implement.

2. The device of claim 1, wherein said stud implement comprises at least one of a metal, a soft plastic, a hard plastic, a rubber, a wood, a stone, a polymer, an alloy, and composite material.

3. The device of claim 2, wherein said textile protective component is selected from the group consisting of, wool, fibers, cotton, linen or blends thereof, cotton canvas or number duck, plastic, polyester, nylon, vinyl, engineered polymer fabric, woven and non-woven aramid fiber fabric, coated fiberglass fabric, rubberized fabric, synthetic rubber-like fabric, and nitrile material.

4. The device of claim 2, wherein said textile protective component is selected from the group consisting of, carbon fiber, mesh material, stretchable rubber fabrics, internal layers of thermal insulating and/or impact minimizing and impact absorbing materials including polyester felt, or natural wool felt, or any other non-woven felt-like material, non-woven filter materials and materials designed to absorb liquids, or chemicals or oil-based substances.

5. The device of claim 3, wherein said hook area is disposed onto an end of an outer surface area of said textile protective component.

6. The device of claim 5, in which said hook area comprises multiple hooks integrated directly onto the end of the outer surface area of said textile protective component.

7. The device of claim 6, wherein said loop area is disposed at an end of an inner surface area of said textile protective component.

8. The device of claim 7, in which said loop area comprises multiple loops integrated directly onto the end of the inner surface area of said textile protective component.

9. The device of claim 3, wherein a combination of said loop area and said hook area is selected from the group consisting of, zippers, clasps, buttons, snap fasteners, grommets, nuts and bolts, magnetic buckles or magnets.

10. The device of claim 3, in which said hook area comprises multiple hooks combined onto a fabric or textile, wherein the fabric or textile with multiple hooks is sewn or glued at the end of the outer surface area of said textile protective component.

11. The device of claim 10, in which said loop area comprises multiple loops combined onto a fabric or textile, wherein the fabric or textile with multiple loops is sewn or glued at an end of inner surface area of said textile protective component opposite the end of the outer surface area of said textile protective component.

12. The device of claim 11, wherein said stud implement comprises a plurality of non-ferrous or non-sparking materials, wherein each of said plurality of non-ferrous or non-sparking materials are disposed in staggered rows.

13. The device of claim 12, further comprising a rivet device, wherein said stud implement is engaged with said textile protective component with said rivet device.

14. The device of claim 13, further comprising a washer appliance, wherein said washer appliance is configured to create a wider and larger hold diameter operable for preventing a pull through by distributing the pull through force over the hold diameter.

15. A method comprising the steps of:
   cutting a textile or fabric protective component, wherein said textile or fabric protective component is configured to encapsulate and protect at least one of a hose, cable, and pipe from abrasion, rubbing, or scraping;

incorporating a loop area onto said textile or fabric protective component, wherein said loop area is configured to removably fasten said textile or fabric protective component to said at least one of a hose, cable, and pipe;

integrating a hook area onto said textile or fabric protective component, wherein said hook area is configured to engage said loop area in fastening said textile or fabric protective component to said at least one of a hose, cable, and pipe;

creating a hole into said textile or fabric protective component; and engaging a stud implement within said hole, wherein said stud implement is configured to be operable for preventing said textile or fabric protective component from contacting a floor, ground, or abrasive surfaces.

16. The method of claim 15, in which said hook area comprises multiple hooks combined onto a first fabric or textile material, wherein the first fabric or textile material with multiple hooks is sewn or glued at a first end of an outer surface area of said textile or fabric protective component.

17. The device of claim 16, in which said loop area comprises multiple loops combined onto a second fabric or textile material, wherein the second fabric or textile material with multiple loops is sewn or glued at a second end opposite the first end onto an inner surface area of said textile protective component.

18. The device of claim 15, in which said hook area comprises multiple hooks that are integrated directly onto a first end of an outer surface area of said textile or fabric protective component.

19. The device of claim 16, in which said loop area comprises multiple loops that are integrated directly onto a second end opposite the first end, onto an inner surface area of said textile or fabric protective component.

20. A device comprising:
    means for encapsulating and protect at least one of a hose, cable, and pipe from abrasion, rubbing, or scraping;
    means for removably fastening said textile or fabric protective component to said at least one of a hose, cable, and pipe;
    means for preventing said textile or fabric protective component from contacting a floor, ground, or other surfaces and prevent abrasion or damage to said textile or fabric protective component; and
    means for accommodating said preventing means into said encapsulating means;
    means for engaging said preventing means to said encapsulating means; and
    means for creating a wider and larger pull through hold diameter of said preventing means.

* * * * *